UNITED STATES PATENT OFFICE.

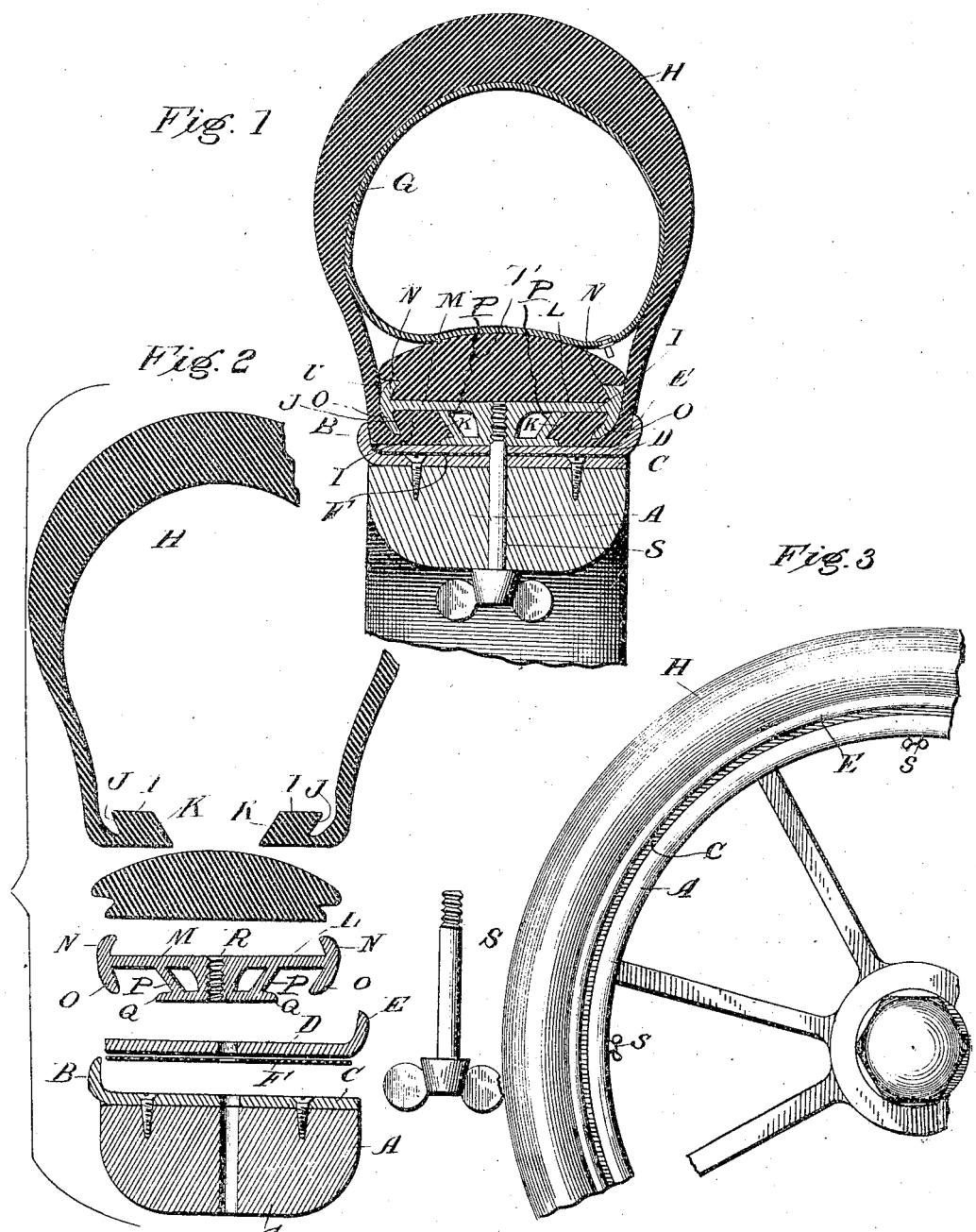

JOHN C. RAYMOND, OF NEW YORK, N. Y.

TIRE.

No. 817,668.  Specification of Letters Patent.  Patented April 10, 1906.

Application filed June 9, 1905. Serial No. 264,428.

*To all whom it may concern:*

Be it known that I, JOHN C. RAYMOND, a citizen of the United States, and a resident of New York, in the county of New York and State of New York, have made certain new and useful Improvements in Tires, of which the following is a specification.

My invention is an improvement in tires especially designed for use on automobiles; and the invention consists in certain novel constructions and combinations of parts, as will be hereinafter described and claimed.

In the drawings, Figure 1 is a cross-section of a tire embodying my invention. Fig. 2 illustrates the several parts detached; and Fig. 3 is a side view, partly broken away, of a wheel embodying my invention.

In carrying out my invention I provide the frame A of the wheel at one side with the upturned flange B, extending circumferentially around the wheel and preferably formed at one edge of a rim-plate C, whose edge opposite the flange B is free and unobstructed, so that the base-plate D, which fits upon the rim plate C, may be slipped laterally over the said rim-plate from the right in Fig. 1. This base-plate D is provided at its outer edge with an upturned flange E, corresponding to the flange B, so that when the tire is applied, as shown in Fig. 1, the parts B and D constitute outwardly-projecting flanges at the opposite edges of the rim A. By preference the base-plate D is provided on its under side with a lining F, of rubber or the like, to prevent any rattling when the parts are assembled, as shown in Fig. 1.

The tire, as shown, has an inner tube G and the casing H, the latter being preferably thickened at its periphery, as usual, and being provided along its edges with the inwardly-projecting circumferentially-extending ribs I, which are undercut at their inner edges J and are preferably sloped at their outer edges K, as will be understood from Figs. 1 and 2.

In connection with the casing I prefer to employ what, for convenience of reference, I term the "tire-frame" L, which comprises a main plate M, having at its opposite side edges the outwardly-projecting inturned flanges N and the inwardly-projecting inturned flanges O. I also provide the frame L with the inwardly-projecting centrally-disposed web P, having the outwardly-extending flanges Q opposing the inturned flanges O and aiding the same in securing the ribs I of the tire-casing in connection with the tire-frame when applied as shown in Fig. 1. The tire-frame is also provided at intervals with threaded openings R for the bolts S, which secure the tire to the rim of the wheel, and in practice I usually employ about four of these bolts to each wheel, as will be understood from Fig. 3.

In order to prevent any injury to the inner tube or to the casing when the tire is collapsed, I provide upon the tire-frame a circumferential cushion T, grooved in its outer edges at U to receive the inturned flanges N upon the outer face of the tire-frame. This cushion T may be of rubber or other suitable material, forms a seat for the inner side of the inner tube G, and when the tire is collapsed will tend to avoid any injury to the parts G and H, as will be understood from Fig. 1 of the drawings.

In operation the parts T, L, and D are assembled as shown in Fig. 1, the tire-frame holding the casing, the cushion, and the inner tube and the base-plate D being applied to secure the casing in engagement with the tire-frame and to form a carrier for the parts ready for application to the frame of the wheel, as shown at the bottom of Fig. 2. The base-plate, with the tire in place, can now be slipped laterally over the rim-plate C from the right in the position of parts shown in Fig. 1 and the screws S be applied to secure the parts in place, as shown in the said Fig. 1.

The construction is simple, easily applied and removed, and forms a durable construction in use, avoiding any unsightly constructions upon the outer side of the wheel or tire.

What I claim is—

1. The combination substantially as herein described, of the rim, the rim-plate thereon, and provided at one edge with an upturned flange and having its other opposite edge unobstructed, the base-plate adapted to slip over said unobstructed edge and having its inner edge unobstructed and its outer edge provided with an upturned flange, the tire-frame having threaded openings for the securing-screws and provided at its outer edges with the outwardly-projecting inturned flanges for securing the cushion, and with the inwardly-projecting inturned flanges for engagement with the casing-ribs, said tire-frame being also provided with the central circumferential web having the outwardly-projecting flanges opposing the inwardly-projecting flanges at the outer edges of said frame, the casing provided along its edges with the circumferential ribs undercut for engagement with the outer inturned flanges of the tire-casing, and fitting in the circumferential undercut channels formed by said outer inwardly-turned flanges and the opposing web-flanges of the tire-frame, the cushion held to and extending around the outer side of the tire-frame, the inner tube within the casing and bearing against the outer side of the cushion, and the screws passed through the rim-plate and tire-plate and connected with the tire-frame, substantially as and for the purposes set forth.

2. The combination with the rim and the rim-plate thereon and having at one edge the outwardly-turned flange and its other edge unobstructed, the tire-frame, the casing held to the tire-frame, and the base-plate fitting in the casing and tire-frame and provided at one edge with the outwardly-turned flange and having its opposite edge unobstructed and slipped at such edge over the unobstructed edge of the rim-plate, and the screws for securing the rim, rim-plate, base-plate and tire-frame together, substantially as set forth.

3. The combination with the rim and the rim-plate thereon and provided at one edge with an outwardly-projecting flange and having its other edge unobstructed, the casing, the tire-frame, and the base-plate forming a carrier for said casing and tire-frame, and having at one edge the upturned flange and its other edge unobstructed and slipped over the unobstructed edge of the rim-plate, and means for securing the base-plate and tire-frame to the rim, substantially as set forth.

4. The combination substantially as herein described of the casing, the tire-frame and the cushion upon the tire-frame and within the casing, the tire-frame being provided on its outer side with inturned devices engaging with and securing the cushion, and upon its inner side with means engaging with and securing the casing.

5. The combination of the tire-frame, provided upon its inner side at its opposite edges with circumferential undercut channels and having at its outer side at its edges outwardly-projecting inturned flanges, the casing having at its edges the longitudinal ribs held in the channels of the tire-frame, and a cushion within the casing and held in the outwardly-projecting inturned flanges of the tire-frame, substantially as set forth.

6. The combination of the casing, the tire-frame securing the casing, the cushion on the tire-frame and within the casing, the base-plate forming a carrier for the casing and tire-frame, and the rim-plate adapted to receive said base-plate, substantially as set forth.

JOHN C. RAYMOND.

Witnesses:
  SOLON C. KEMON,
  PERRY B. TURPIN.